United States Patent Office 3,288,816
Patented Nov. 29, 1966

3,288,816
DIALKANESULFONIMIDES
Joseph E. Dunbar, Midland, Mich., assignor to The Dow Chemical Company, Midland, Mich., a corporation of Delaware
No Drawing. Filed May 8, 1964, Ser. No. 366,157
7 Claims. (Cl. 260—396)

This invention is directed to the naphthalene diimines and more particularly, substituted 5,8-dihydro-5,8-methano-1,4-naphthoquinonedialkanesulfonimides having the structure

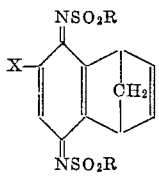

In this and succeeding formulae, R represents lower alkyl and X represents hydrogen, bromo, chloro, fluoro, cyclohexylthio or phenylthio. In the present specification and claims "lower alkyl" is employed to designate a straight or branched chain alkyl group containing up to and including 4 carbon atoms. The products of the present invention are crystalline solids which are soluble in many common organic solvents and of low solubility in water. These products have been found to be useful as pesticides for the control of a number of undesirable species including various helminth, insect, bacterial and fungal organisms such as tapeworms, blight, and Fusarium.

The products of the present invention can be prepared by allowing lead tetraacetate to react with a substituted 5,8-dihydro-5,8-methano-1,4-naphthalene dialkyl sulfonamide compound having the structure

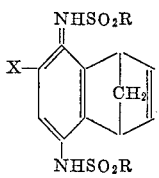

The reactants can conveniently be combined in the presence of liquid reaction medium such as ethanol or methanol as reaction media, however, it is preferable to carry out the reaction in an aliphatic acid such as glacial acetic acid. When an organic solvent is employed as reaction medium it is preferable to employ dry lead tetraacetate. The reaction can be carried out at any temperature in the range of from 0 to 100° C., however a preferred temperature range is from 25 to 90° C. The amounts of the reactants to be employed are not critical, some of the desired product being formed when employing the reactants in any proportions.

In carrying out the reaction, the reactants can be combined in any convenient fashion. The lead tetraacetate and the naphthalene diamide can be combined and the mixture combined with the liquid reaction medium or the lead tetraacetate can be admixed with the liquid reaction medium and the naphthalene diamide added thereto. However, in a preferred procedure the substituted 5,8-dihydro-5,8-methano-1,4-naphthalene disulfonamide starting material is admixed with the liquid reaction medium and the lead tetraacetate added with agitation to the mixture. Following the addition, the reaction mixture can be maintained at the reaction temperature for a short period of time to insure completion of the reaction. The product is then isolated by any convenient method. In a preferred method, the reaction mixture is diluted with water and the crystalline product which precipitated during the dilution procedure collected by such common procedures as filtration or decantation. The crystalline product thus collected, can be employed in pesticidal applications or further purified by such conventional procedures as washing and recrystallization. In a preferred procedure, a small amount of a glycol such as ethylene glycol is added to the reaction mixture following the reaction period to destroy any excess lead tetraacetate which might be present. The reaction mixture is then stirred for an additional short period of time before the reaction mixture is diluted with water and processed exactly as described above.

The following examples are merely illustrations and are not to be construed as limiting.

EXAMPLE 1

5,8-dihydro-5,8-methano-1,4-naphthoquinone-dimethanesulfonimide

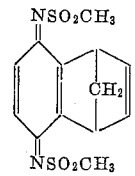

Lead tetraacetate (82.5 grams; 0.186 mole) was added with stirring to 50.0 grams (0.152 mole) of 5,8-dihydro-5,8 - methano - 1,4-naphthalenedimethanesulfonamide in 600 milliliters of glacial acetic acid. Stirring was thereafter continued, and the reaction mixture was maintained at room temperature for 30 minutes to insure completion of the reaction. At the end of this period, four milliliters of ethylene glycol was added to the reaction mixture, and the resulting mixture stirred for an additional 15 minutes. Following this procedure, the reaction mixture was diluted with 350 milliliters of water and the red solid, 5,8 - dihydro - 5,8-methano-1,4-naphthoquinonedimethanesulfonimide product, which precipitated during the dilution procedure, was collected by filtration. This product was three times recrystallized from nitromethane and was found to decompose without melting at 208° C. and to have carbon, hydrogen and sulfur contents of 47.83 percent, 4.22 percent and 19.65 percent, respectively, as compared to the theoretical values of 47.84 percent, 4.32 percent and 19.65 percent, respectively.

EXAMPLE 2

2-chloro-5,8-dihydro-5,8-methano-1,4-naphthoquinone-dimethanesulfonimide

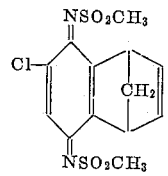

Lead tetraacetate (15.8 grams; 0.0358 mole) was added with stirring to a suspension of 10.0 grams (0.0276 mole) of 2-chloro-5,8-dihydro-5,8-methano-1,4-naphthalenedimethanesulfonamide in 120 milliliters of glacial acetic acid. The resulting mixture was thereafter maintained at room temperature and stirred continuously for one hour to insure completion of the reaction. Three milliliters of ethylene glycol was then added to the reaction mixture, and the resulting mixture was stirred for another 10 minutes, whereupon the reaction mixture was diluted with 120 milliliters of water. The maroon crystals of product, which precipitated during the dilution procedure, were collected by filtration and recrystallized from a mixture of chloroform and carbon tetrachloride. The recrystallized 2-chloro-5,8-dihydro-5,8-methano-1,4- naphthoquinonedimethanesulfonimide product was a brick red solid which melted with decomposition at 217–218° C. This product was found to have carbon, hydrogen and nitrogen contents of 42.83 percent, 3.60 percent and 7.77 percent, respectively, as compared with theoretical contents of 43.27 percent, 3.63 percent and 7.77 percent, respectively.

EXAMPLE 3

*2-cyclohexylthio-5,8-dihydro-5,8-methano-1,4-naphthoquinonedimethanesulfonimide*

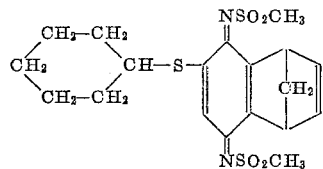

Lead tetraacetate (1.98 grams; 0.00447 mole) was added to 1.65 grams (0.00373 mole) of 2-cyclohexylthio-5,8 - dihydro - 5,8 - methano-1,4-naphthalenedimethanesulfonamide dispersed in 25 milliliters of glacial acetic acid. The resulting mixture was maintained at room temperature and stirred continuously for 1 hour to insure completion of the reaction. Following the reaction, one milliliter of ethylene glycol was added to the reaction mixture and the resulting mixture was stirred for an additional 10 minutes. Thereafter, 15 milliliters of water was added to the reaction mixture and the resulting mixture cooled in an ice bath. During the cooling period, the 2 - cyclohexylthio - 5,8 - dihydro-5,8-methano-1,4-naphthoquinonedimethanesulfonimide product precipitated as a dark maroon solid and was collected by filtration. This solid product was recrystallized from a mixture of petroleum ether (B.P. 60–70°) and benzene. The recrystallized product melted at 176–177° C. and had carbon, hydrogen and nitrogen contents of 51.89 percent, 5.57 percent and 6.60 percent, respectively, as compared to the theoretical contents of 51.79 percent, 5.49 percent and 6.36 percent, respectively.

EXAMPLE 4

*2-phenylthio-5,8-dihydro-5,8-methano-1,4-naphthoquinonedimethanesulfonimide*

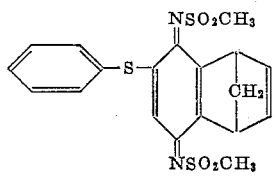

2 - phenylthio - 5,8-dihydro-5,8-methano-1,4-naphthalenedimethanesulfonamide (5.17 grams; 0.0118 mole) lead tetraacetate (7.45 grams; 0.0168 mole) and glacial acetic acid (50 milliliters) were combined and stirred at room temperature for 40 minutes. Thereafter the mixture was heated on the steam bath for one hour. Following the heating period the reaction mixture was allowed to cool to room temperature. When the mixture reached room temperature, one milliliter of ethylene glycol was added and the resulting mixture stirred for 20 minutes. The mixture was then diluted with 50 milliliters of water, whereupon, the 2-phenylthio-5,8-dihydro-5,8 - methano - 1,4-naphthoquinonedimethanesulfonimide product precipitated as a crystalline solid. The crystalline product was removed by filtration, dried and dissolved in a hot solution of benzene and cyclohexane. The hot solution was treated with activated charcoal, filtered and allowed to cool, whereupon the product crystallized. This operation was repeated to give the product as grey-brown crystals, melting with decomposition at 206° C. and having a nitrogen content of 6.20 percent as compared with a theoretical value of 6.45 percent.

In a similar manner the following compounds of the present invention can be prepared.

2 - cyclohexylthio - 5,8-dihydro-5,8-methano-1,4-naphthoquinonedibutanesulfonimide (molecular weight 655.4) can be prepared by reacting lead tetraacetate and 2-cyclohexylthio - 5,8 - dihydro - 5,8-methano-1,4-naphthalenedibutanesulfonamide.

2 - bromo - 5,8 - dihydro - 5,8-methano-1,4-naphthoquinonediethanesulfonimide (molecular weight 406.3) can be prepared by reacting lead tetraacetate and 2-bromo-5,8 - dihydro - 5,8 - methano-1,4-naphthalenediethanesulfonamide.

2 - fluoro-5,8-dihydro-5,8-methano-1,4-naphthoquinonedipropanesulfonimide (molecular weight 345.4) can be prepared by reacting lead tetraacetate and 2-fluoro-5,8-dihydro - 5,8 - methano-1,4-naphthalenedipropanesulfonamide.

5,8 - dihydro - 5,8 - methano-1,4-naphthoquinonediisobutanesulfonimide (molecular weight 655.4) by reacting lead tetraacetate and 5,8-dihydro-5,8-methano-1,4-naphthalenediisobutanesulfonamide.

2 - phenylthio - 5,8 - dihydro-5,8-methano-1,4-naphthoquinonedipropanesulfonimide (molecular weight 521.4) by reacting lead tetraacetate and 2-phenylthio-5,8-dihydro-5,8-methano-1,4-naphthalenedipropanesulfonamide.

The new compounds of the present invention are useful as pesticides for the control of various undesirable species such as helminth, insect, bacterial and fungal organisms. For such uses the unmodified compounds can be employed. The product can also be dispersed on a finely divided solid and employed as a dust. Such mixtures can be dispersed in water with or without the aid of a surface active dispersing agent and the resulting aqueous dispersions employed as sprays, drenches or washes. In other procedures, the products of the invention can be employed as toxic constituents in solvent solutions, oil-in-water or water-in-oil emulsions or aqueous dispersions. In representative operations, aqueous compositions containing 2-chloro-5,8-dihydro-5,8-methano-1,4-naphthoquinonedimethanesulfonimide at concentrations of 300 parts per million, by weight, gave complete kills of tomato and potato early and late blights (*Alternaria solani* and *Phythophthora infestans*). In other representative operations, finely divided solid compositions containing 5,8 - dihydro-5,8-methano-1,4-naphthoquinonedimethanesulfonimide at concentrations of 0.25 mole percent by weight gave complete kills of *Hymenolepis nana* and *Hymenolepis diminuta*.

The substituted 5,8-dihydro-5,8-methano-1,4-naphthalene disulfonamide starting materials such as a substituted naphthalene disulfonamide, 2-cyclohexyl substituted naphthalene disulfonamide, and the halo substituted naphthalene disulfonamide, employed in preparing the compounds of the present invention can be prepared by known procedures wherein a substituted p-quinonediimide corresponding to the formula

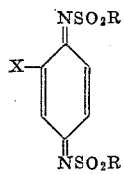

is combined with cyclopentadiene in the presence of a tertiary-amine. The reaction is conveniently carried out in an inert solvent such as benzene or chloroform and at a temperature between 0 to 110° C. Following the reaction, the product can be separated by such common procedures as filtration, decantation or evaporation of the reaction solvent and crystallization of the product from a common organic solvent.

The 2 - phenylthio - 5,8-dihydro-5,81methano-1,4-naphthalenedimethanesulfonamide starting material was prepared by reacting 5,8-dihydro-5,8-methano-1,4-naphthoquinone disulfonimide, benzenethiol and trimethylamine. The reaction is conveniently carried out in the presence of an organic solvent such as chloroform and at a temperature between −10 and 60° C. The product is then collected and purified by conventional procedures.

I claim:
1. A compound corresponding to the formula

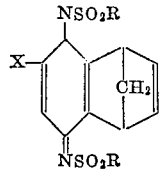

wherein R represents lower alkyl and X represents a member of the group consisting of hydrogen, chloro, bromo, fluoro, cyclohexylthio and phenylthio.

2. 5,8 - dihydro - 5,8 - methano-1,4-naphthoquinonedimethanesulfonimide.
3. 2 - chloro - 5,8 - dihydro-5,8-methano-1,4-naphthoquinonedimethanesulfonimide.
4. 2 - cyclohexylthio - 5,8 - dihydro-5,8-methano-1,4-naphthoquinonedimethanesulfonimide.
5. 2 - phenylthio - 5,8 - dihydro-5,8-methano-1,4-naphthoquinonedimethanesulfonimide.
6. 2 - bromo - 5,8 - dihydro-5,8-methano-1,4-naphthoquinonedipropanesulfonimide.
7. 2 - chloro - 5,8 - dihydro-5,8-methano-1,4-naphthoquinonediethanesulfonimide.

No references cited.

WALTER A. MODANCE, *Primary Examiner.*
HARRY I. MOATZ, *Assistant Examiner.*